US006264169B1

(12) United States Patent
Hung

(10) Patent No.: US 6,264,169 B1
(45) Date of Patent: Jul. 24, 2001

(54) JACK WITH ENCLOSING PLATES

(75) Inventor: Michael Hung, Lu Chu Hsiang (TW)

(73) Assignee: Shinn Fu Corporation, Tao Yuan (TW)

( * ) Notice: Subject to any disclaimer, the term of this patent is extended or adjusted under 35 U.S.C. 154(b) by 0 days.

(21) Appl. No.: 09/436,261

(22) Filed: Nov. 9, 1999

(51) Int. Cl.[7] ........................ B60P 1/48
(52) U.S. Cl. ........................ 254/8 B; 254/1; 254/DIG. 1
(58) Field of Search ........................ 254/8 B, 93 R–DIG. 1

(56) References Cited

U.S. PATENT DOCUMENTS 5,431,369 * 7/1995 Hung ........................ 254/88

* cited by examiner

*Primary Examiner*—Robert C. Watson
(74) *Attorney, Agent, or Firm*—Varndell & Varndell, PLLC

(57) ABSTRACT

A jack with enclosing or cover plates is disclosed, which is especially suited for enclosing the supporting plates at two sides of a four wheel jack and the pump of the jack. The jack can be combined with two supporter enclosing plates and a pump enclosing plate which may have any desired shape or color, so that the outlook of the jack is vivid and various. By the enclosing or cover plates, painting for the related shielding components by baking or injection can be omitted. The cover or enclosing plate can be secured by tenons or screwing lock. Thus, the present invention has a simple structure and can be assembled easily.

7 Claims, 3 Drawing Sheets

JACK WITH ENCLOSING PLATES

FIELD OF THE INVENTION

The present invention relates to a jack with enclosing (or cover) plates which is especially suited for enclosing the supporting plates at two sides of a four wheel jack and the pump of the jack. The enclosing plates can have any desired shape or colors so that the outlook of the jack is vivid and various. By the enclosing the jack with the enclosing plates, painting for the related shielding components by baking or injection can be omitted.

BACKGROUND OF THE INVENTION

The prior art jack primarily includes a hydraulic cylinder, a pump set, a lifting arm, a top disk, and supporting plates at two sides. Each of four ends at the bottom of the supporting plates is installed with a respective rolling wheel. However, such kind of jack has a dull and fixed outlook. Moreover, all the components are protruded. Thus, the components must be made to match with each other by the work of painting by baking or injection for beautifying. However, only the exposed portions are colored, and thus the all structure still appears a dull outlook without any attraction to users.

SUMMARY OF THE INVENTION

Accordingly, the primary object of the present invention is to provide a jack with enclosing (or cover) plates. The supporting plates at two sides of the jack and the hollow portion of the pump are enclosed by the enclosing (or cover) plates. Thus, the jack has a vivid outlook and is colored without confining by the predetermined shape. The exposed components of the jack is beautified. By the jack with the enclosing (or cover) the enclosing the enclosing plates, painting for the related shielding components by baking or injection can be omitted.

Another object of the present invention is to provide a jack with enclosing (or cover) plates. The cover or enclosing plate can be secured by tenons or screwing lock. Thus, the present invention has a simple structure and can be assembled easily.

A further object of the present invention is to provide a jack with enclosing or cover plates, further comprising a pump enclosing plate for being connected with the supporter enclosing or cover plate at two sides. One or more engaging holes are formed at the upper end of the supporter enclosing or cover plates, and a hollow hole is formed in front section at each side of the pump enclosing plate for covering the two supporter enclosing plates, i.e. at a position in the jack pump with respect to a release valve so that after covering, part of the pump set and the release valve will protrude out. The two sides of the pump enclosing or cover plates are installed with respective engaging piece for inserting into the engaging hole of the supporting enclosing plate so as to be combined tightly.

The various objects and advantages of the present invention will be more readily understood from the following detailed description when read in conjunction with the appended drawing.

DETAILED DESCRIPTION OF THE PREFERRED EMBODIMENTS

Figure 1:
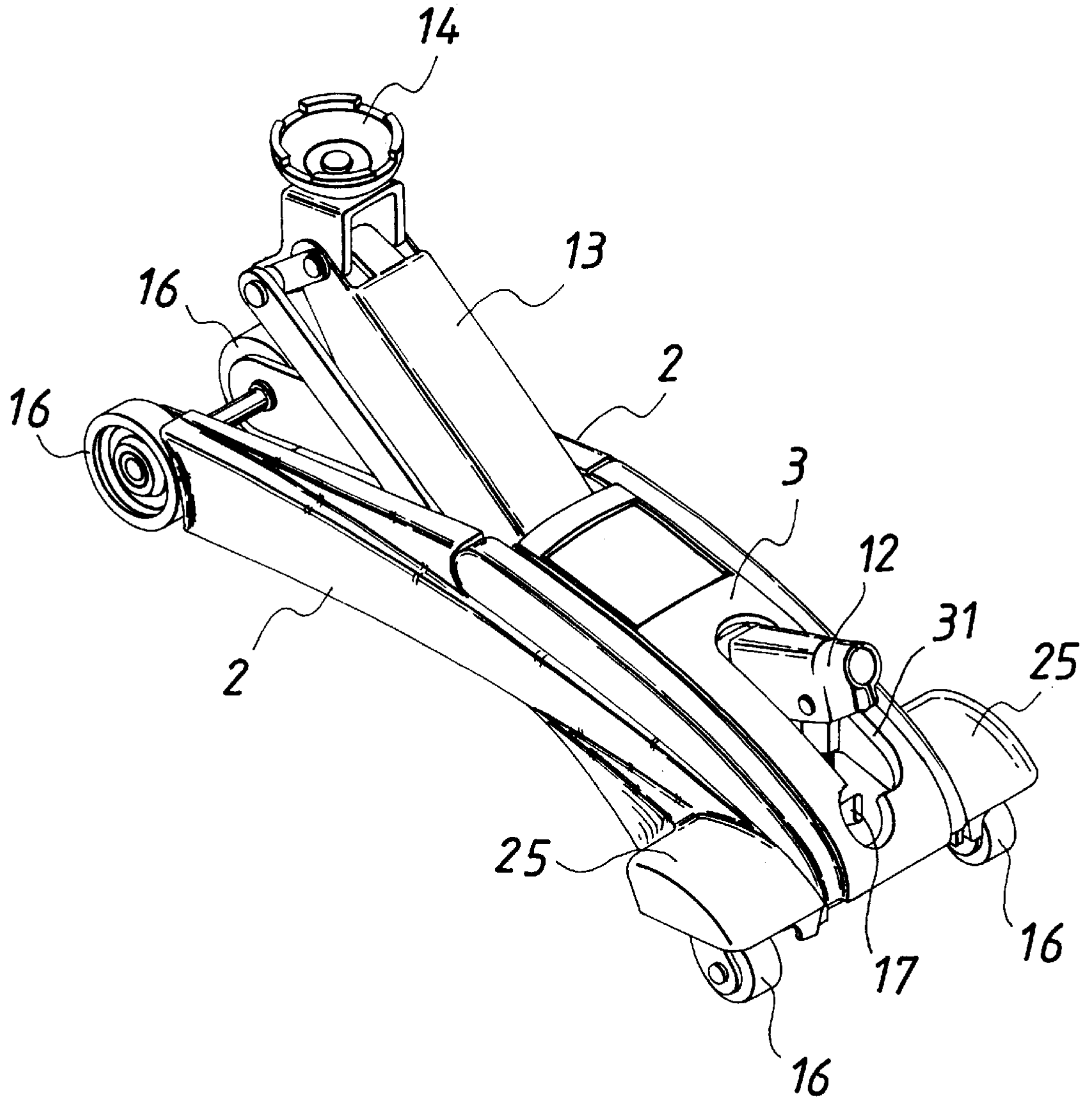
FIG. 1 is an assembled perspective view of the present invention.
Figure 2:
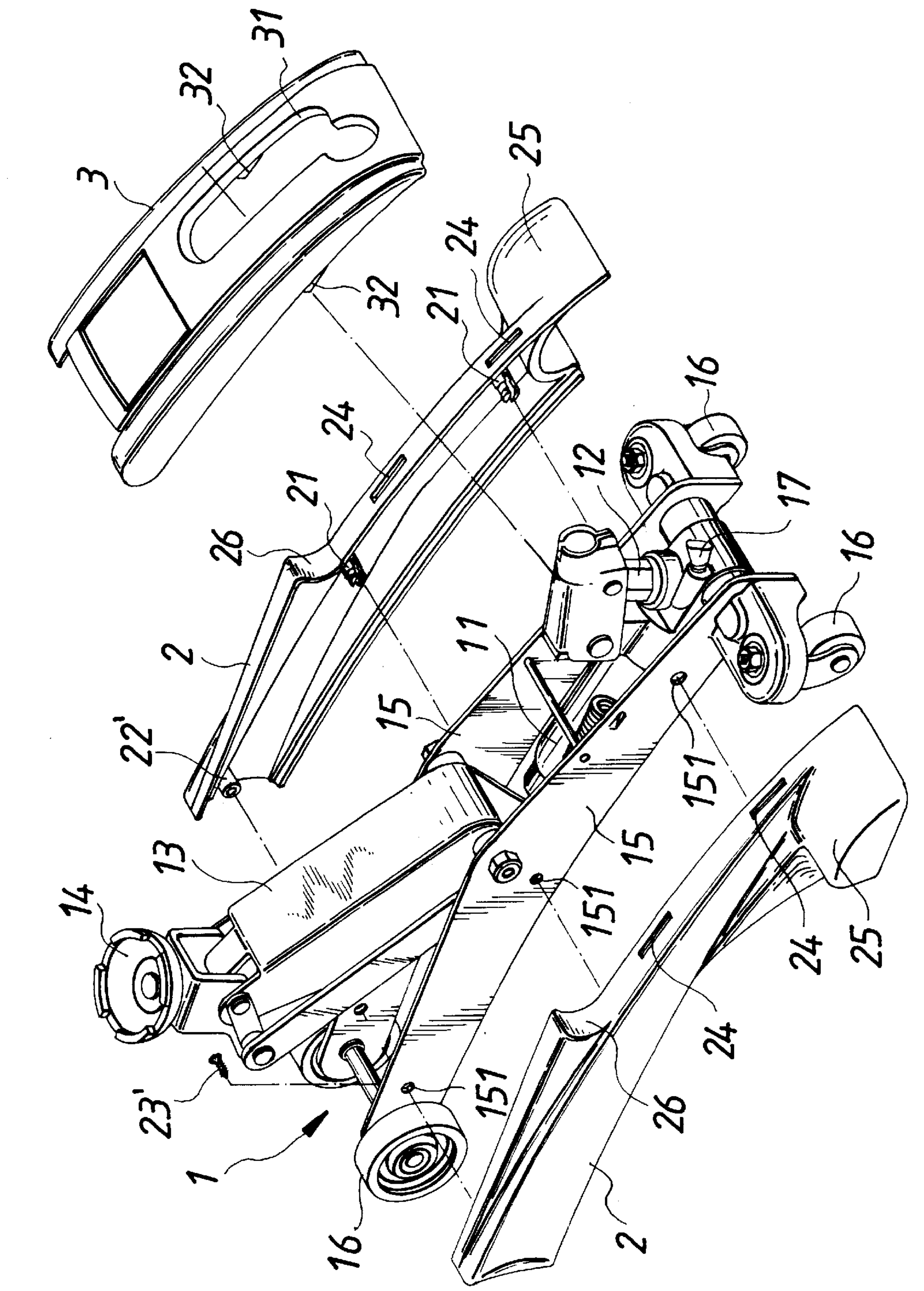
FIG. 2 is an exploded perspective view of the present invention.

With reference to FIGS. 1 and 2, the jack with enclosing plates of the present invention is illustrated. The jack with enclosing plates includes a four wheel jack 1, and supporter enclosing or cover plates 2 at two sides. Furthermore, a pump 3 can be installed above the two supporter enclosing or cover plates 2.

The four wheel jack has a basic structure as that in the prior art and includes a hydraulic cylinder 11, a pump set 12, a top disk 14, and supporting plates 15 at two sides, and other prior art elements. Four ends at the bottom of the supporting plates 15 each is installed with a rolling wheel 16, respectively. At the selecting location of the supporting plates 15 are installed with a plurality of connecting holes 151, respectively for being firmly secured by the supporter enclosing plates 2 described hereafter.

Figure 3:
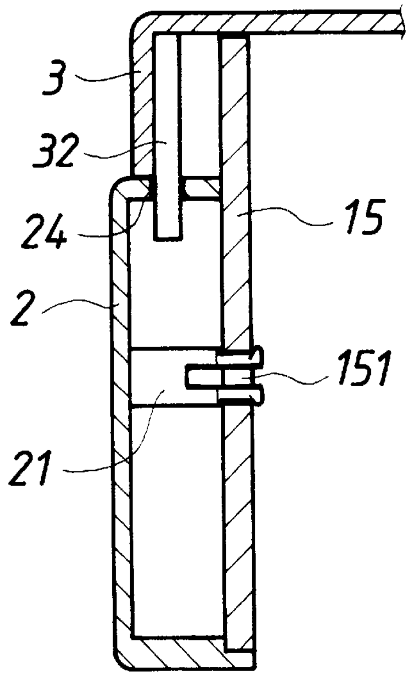
FIG. 3 is a schematic cross sectional view showing supporter enclosing plates and the pump enclosing plate being combined to the supporting plates at two sides of the jack.

The supporter enclosing or cover plates 2 each has a size corresponding to that of the supporting plate 15, but its shape can be different. The inner surface of the plate thereof is installed with connecting elements at location with respect to the connecting holes 151 of the supporting plates 15 at two sides of the jack 1 (as the tenon 21 shown in FIG. 2). Thus, the supporter enclosing or cover plates 2 can be embedded into the connecting holes 151 of the supporting plates 15 and a firm connection can be formed (as shown in FIG. 3).

In the aforesaid assembly, each supporting plate 15 of the jack 1 can be connected with a supporter enclosing or cover plate 2. The supporter enclosing or cover plate 2 can be made of plastics or other similar materials, and may have any desired shape or colors. Therefore, the assembled jack has a vivid outlook. Moreover, the process of painting by baking or injection can be omitted.

Figure 5:
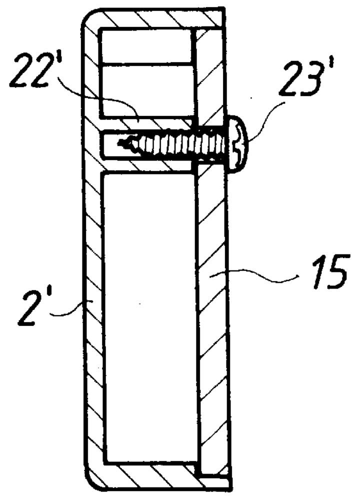
FIG. 5 is a schematic cross sectional view showing supporter enclosing plates being combined to the supporting plates at two sides of the jack in other embodiment.

According to the present invention, in the connection of the tenons 21 and the connecting holes 151, the supporter enclosing or cover plates 2 and the supporting plates 15 at two sides of the jack 1 are connected in a simply way. Thus, the connection is not confined to only tenons. For example, in FIG. 4, the inner side of each enclosing or cover plates 2 may be installed with hollow studs 22' matching with the correspondent connecting holed 151 of the supporting plates 15 of the jack 1, as shown in FIG. 5. Thereby, by the screwing elements 23', the similar constructions can be engaged with the jack.

The supporter enclosing or cover plates 2 at two sides can be connected to a pump enclosing plates 3 for further shielding the hydraulic cylinder 11 and the pump 12 of the jack 1.

Each supporter enclosing or cover plate 2 is installed with one or more engaging holes 24 at selected places at the upper end thereof.

The pump enclosing or cover plate 3 exactly covers the space between the two supporting plates 15 of the jack 1.

Figure 4:
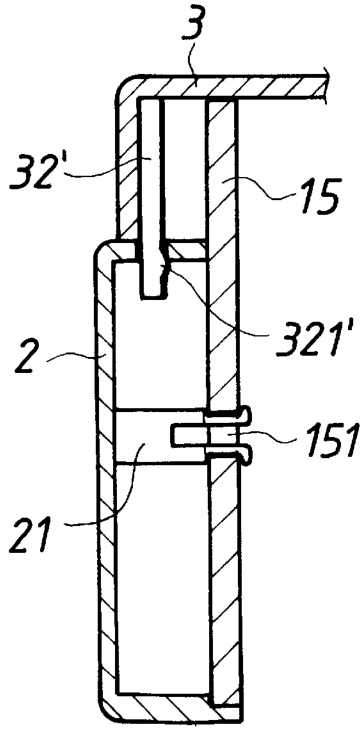
FIG. 4 is a schematic cross sectional view showing in another embodiment the supporter enclosing plates and the pump enclosing plate being combined to the supporting plates at two sides of the jack.

The hollow hole 31 is formed at the position of the pump set 12 of the jack with respect to a release valve 17. Thus, after covering, part of the pump set 12 and the releasing valve 17 can protrude out. Moreover, two sides of the pump enclosing or cover plate 3 are installed with a corresponding engaging piece 32 for being engaged with the engaging holes 24 of the enclosing plate 3 and to form with a tightening combination. Or, moreover, as shown in FIG. 4, a stopping hook 321' can be added to the distal end of the engaging piece 32' to increase the stability of combination.

The supporter enclosing or cover plates 2 or the pump enclosing or cover plate 3 aforesaid can have various shapes or colors so that the outlook of the jack is vivid. For example, a protruded rolling wheel cover 25 can be formed at one or two ends of the supporter enclosing or cover plates 2, as shown in FIG. 1. A proper concave arc 26 can be formed at the connection of the two supporter enclosing or cover plates 2 and the pump enclosing plate 3, so that as the pump enclosing or cover plates 3 is embedded, and a smooth plane can be presented.

Accordingly, by the enclosing or cover plates of the present invention, the jack may have a novel outlook different from that in the prior art. Moreover, painting by baking or injection is unnecessary. Although the present invention has been described with reference to the preferred embodiments, it will be understood that the invention is not limited to the details described thereof. Various substitutions and modifications have been suggested in the foregoing description, and others will occur to those of ordinary skill in the art. Therefore, all such substitutions and modifications are intended to be embraced within the scope of the invention as defined in the appended claims.

What is claimed is:

1. A jack with supporter cover plates comprising a jack having two supporting plates at two sides of the jack and extending a length of the jack, the supporter cover plates are installed on the supporting plates, the supporter cover plates respectively have a sufficient size for covering the supporting plates and are adapted to cover protrusions on the supporting plates and to provide an overall pleasing appearance for the sides of the jack, the supporting plates having a plurality of connecting holes at locations along a length thereof, and inner sides of respective supporter cover plates having connecting elements corresponding to the connecting holes of the supporting plates for securing the supporter cover plates to the supporting plates.

2. A jack with supporter cover plates comprising a jack having two supporting plates at two sides of the jack, the supporter cover plates are installed on the supporting plates, the supporter cover plates respectively have a size approximately equal to that of the supporting plates and are adapted to cover protrusions on the supporting plates and to provide an overall pleasing appearance for the sides of the jack, the supporting plates having a plurality of connecting holes at locations along a length thereof, and inner sides of respective supporter cover plates having tenons corresponding to the connecting holes of the supporting plates for securing the supporter cover plates to the supporting.

3. A jack with supporter cover plates comprising a jack having two supporting plates at two sides of the jack, the supporter cover plates are installed on the supporting plates, the supporter cover plates respectively have a size approximately equal to that of the supporting plates and are adapted to cover protrusions on the supporting plates and to provide an overall pleasing appearance for the sides of the jack, the supporting plates having a plurality of connecting holes at locations along a length thereof, and inner sides of respective supporter cover plates having hollow studs corresponding to the connecting holes of the supporting plates for securing the supporter cover plates to the supporting plates.

4. The jack with supporter cover plates as claimed in claim 1, further comprising a pump cover plate connected to the supporter cover plates at a position in a jack pump with respect to a release valve of the jack, so that after covering, parts of the jack pump and the release valve will protrude out; engaging holes are formed at an upper end of the supporter cover plate, and a hole is formed in front section at two sides of the pump cover plate, and the two sides of the pump cover plate are secured to the supporter cover plates by engaging pieces respectively received in the engaging holes of the supporter cover plates and in the holes of the pump cover plate.

5. The jack with supporter cover plates as claimed in claim 1, wherein a wheel is installed in at least one end of the supporting plates, and the supporter cover plates are adapted to cover the wheel.

6. The jack with enclosing plates as claimed in claim 5, wherein a stopping hook is formed at a distal end of the engaging piece so that the connection therebetween is more secure.

7. The jack with enclosing plates as claimed in claim 5, wherein a concave arc is formed at each connection of the supporter cover plates with the pump cover plate, so that as the pump cover plate is embedded, a smooth joint surface is formed.

* * * * *